United States Patent
Yamauchi

(10) Patent No.: US 11,676,241 B2
(45) Date of Patent: Jun. 13, 2023

(54) CONTROL METHOD FOR IMAGE PROJECTION SYSTEM, AND IMAGE PROJECTION SYSTEM

(71) Applicant: SEIKO EPSON CORPORATION, Tokyo (JP)

(72) Inventor: Taisuke Yamauchi, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 220 days.

(21) Appl. No.: 17/162,725

(22) Filed: Jan. 29, 2021

(65) Prior Publication Data
US 2021/0241419 A1 Aug. 5, 2021

(30) Foreign Application Priority Data
Jan. 31, 2020 (JP) .............................. JP2020-014474

(51) Int. Cl.
 G06T 3/00 (2006.01)
 G06T 5/00 (2006.01)
 (Continued)

(52) U.S. Cl.
 CPC ............ *G06T 3/005* (2013.01); *G06T 3/0031* (2013.01); *G06T 5/006* (2013.01); *G06T 7/521* (2017.01);
 (Continued)

(58) Field of Classification Search
None
See application file for complete search history.

(56) References Cited

U.S. PATENT DOCUMENTS

| 2016/0014385 A1 | 1/2016 | Sano et al. |
| 2018/0007329 A1 | 1/2018 | Tanaka et al. |

(Continued)

FOREIGN PATENT DOCUMENTS

| JP | 2005-244835 A | 9/2005 |
| JP | 2009-005044 A | 1/2009 |

(Continued)

OTHER PUBLICATIONS

S. Jordan and M. Greenspan, "Projector optical distortion calibration using Gray code patterns," 2010 IEEE Computer Society Conference on Computer Vision and Pattern Recognition—Workshops, 2010, pp. 72-79, doi: 10.1109/CVPRW.2010.5543487. (Year: 2010).*

*Primary Examiner* — James A Thompson
(74) *Attorney, Agent, or Firm* — Oliff PLC

(57) ABSTRACT

A projector includes a correction information generation unit, an image information correction unit, and an image projection unit. The correction information generation unit sets a first coordinate in a two-dimensional projection formed by flattening out a three-dimensional projection surface onto a plane. The correction information generation unit arranges a first quadrilateral having a first aspect ratio within the two-dimensional projection, based on the first coordinate as a reference position, in such a way that the first quadrilateral comes into contact with an outline of the two-dimensional projection. The correction information generation unit determines whether the first quadrilateral is in contact with the outline of the two-dimensional projection at two or more points, or not. When the first quadrilateral is determined as being in contact with the outline of the two-dimensional projection at two or more points, the image information correction unit corrects image information, based on the first quadrilateral, and thus generates corrected (Continued)

image information. The image projection unit projects an image based on the corrected image information onto the projection surface.

10 Claims, 10 Drawing Sheets

(51) Int. Cl.
  *G06T 11/00* (2006.01)
  *H04N 9/31* (2006.01)
  *G06T 7/521* (2017.01)
  *G06T 15/00* (2011.01)
(52) U.S. Cl.
  CPC .............. *G06T 11/00* (2013.01); *G06T 15/00* (2013.01); *H04N 9/3147* (2013.01); *H04N 9/3185* (2013.01)

(56) References Cited

U.S. PATENT DOCUMENTS

2019/0073753 A1*  3/2019  Yamauchi ............ H04N 9/3188
2019/0166339 A1*  5/2019  De La Cruz .............. G06T 7/70

FOREIGN PATENT DOCUMENTS

| JP | 2015-219679 A | 12/2015 |
| JP | 2015-233266 A | 12/2015 |
| JP | 2016-019194 A | 2/2016 |
| JP | 2016-178448 A | 10/2016 |
| JP | 2019-047312 A | 3/2019 |
| NO | 2005/084017 A1 | 9/2005 |
| TW | 201401874 A | 1/2014 |

* cited by examiner

CONTROL METHOD FOR IMAGE PROJECTION SYSTEM, AND IMAGE PROJECTION SYSTEM

The present application is based on, and claims priority from JP Application Serial Number 2020-014474, filed Jan. 31, 2020, the disclosure of which is hereby incorporated by reference herein in its entirety.

BACKGROUND

1. Technical Field

The present disclosure relates to a control method for an image projection system, and an image projection system.

2. Related Art

When an image is projected on a projection surface that is not a simple plane, for example, a three-dimensional projection surface, the image may be observed as largely distorted, depending on the viewing position of the observer. Therefore, various distortion correction techniques using three-dimensional measurement technologies have been proposed so that, when an image is projected on a three-dimensional projection surface, the observer can observe the image without any distortion from a predetermined viewing position. JP-A-2019-47312 proposes deciding an image area where an image is to be projected, based on a two-dimensional projection formed by flattening out a projection surface onto a plane.

In the technique disclosed in JP-A-2019-47312, in order not to generate any distortion in an image projected on a three-dimensional projection surface and in order to project the image with as large a screen size as possible, the size of the image area needs to be decided so as to be as large as possible without extending out of a two-dimensional projection Pd. However, JP-A-2019-47312 mentions no specific method for deciding the size of the image area that is as large as possible without extending out of the two-dimensional projection Pd.

SUMMARY

In view of the foregoing problem, it is an object of the present disclosure to provide a technique that enables an undistorted image to be projected with as large screen size as possible on a three-dimensional projection surface.

In order to solve the foregoing problem, according to an aspect of the present disclosure, a control method for an image projection system includes: setting a first coordinate in a two-dimensional projection formed by flattening out a three-dimensional projection surface onto a plane; arranging a first quadrilateral having a first aspect ratio within the two-dimensional projection, based on the first coordinate as a reference position, in such away that the first quadrilateral comes into contact with an outline of the two-dimensional projection; determining whether the first quadrilateral is in contact with the outline of the two-dimensional projection at two or more points, or not; correcting image information, based on the first quadrilateral, and thus generating corrected image information, when the first quadrilateral is determined as being in contact with the outline of the two-dimensional projection at two or more points; and projecting an image based on the corrected image information onto the projection surface.

In order to solve the foregoing problem, according to another aspect of the present disclosure, an image projection system includes: a correction device generating corrected image information; and a projection device projecting an image based on the corrected image information onto a projection surface. The correction device sets a first coordinate in a two-dimensional projection formed by flattening out a three-dimensional projection surface onto a plane, and arranges a first quadrilateral having a first aspect ratio within the two-dimensional projection, based on the first coordinate as a reference position, in such a way that the first quadrilateral comes into contact with an outline of the two-dimensional projection. The correction device determines whether the first quadrilateral is in contact with the outline of the two-dimensional projection at two or more points, or not. The correction device corrects image information, based on the first quadrilateral, and thus generates the corrected image information, when the first quadrilateral is determined as being in contact with the outline of the two-dimensional projection at two or more points.

DESCRIPTION OF EXEMPLARY EMBODIMENTS

An embodiment of the present disclosure will now be described with reference to the drawings. The embodiment described below includes various technically preferable limitations. However, the form of embodiment of the present disclosure is not limited to the form described below.

1. Embodiment

Figure 1:
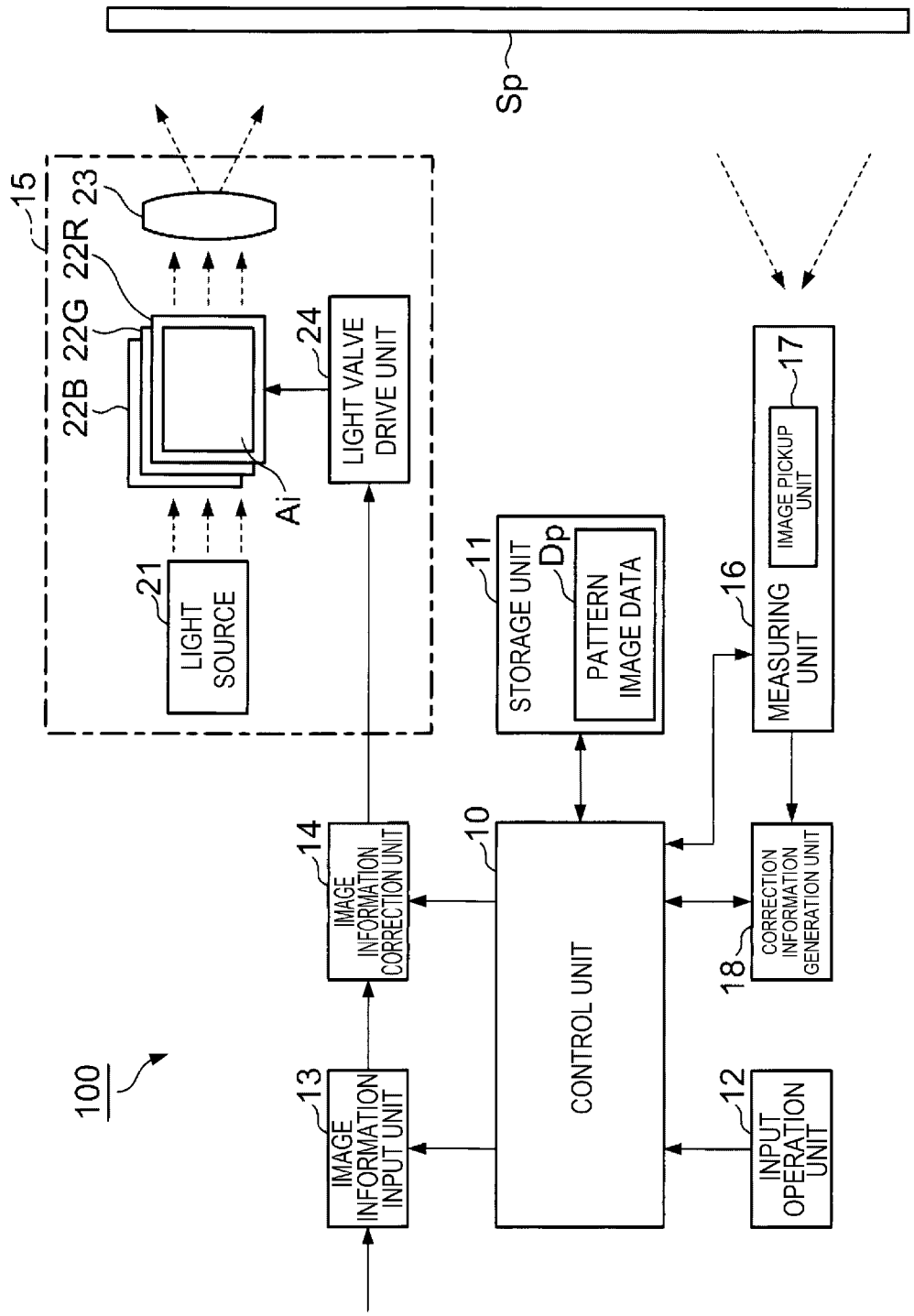
FIG. 1 is a block diagram showing a configuration example of a projector 100 according to an embodiment of the present disclosure.

FIG. 1 is a block diagram showing a configuration example of a projector 100 as an embodiment of the image projection system according to the present disclosure. As shown in FIG. 1, the projector 100 has a control unit 10, a storage unit 11, an input operation unit 12, an image information input unit 13, an image information correction unit 14, an image projection unit 15, a measuring unit 16, and a correction information generation unit 18. The projector 100 projects an image from the image projection unit 15 onto a projection surface Sp, based on image information inputted to the image information input unit 13.

The projector 100 in this embodiment can correct a distortion of an image generated when the image is projected on a projection surface Sp that is not a simple plane, specifically, a distortion of an image generated when the image is projected on a three-dimensional projection surface Sp. More specifically, the projector 100 projects a pattern image Ip shown in FIG. 2 from the image projection unit 15 onto the projection surface Sp and measures the three-dimensional shape of the projection surface Sp by the measuring unit 16. The projector 100 then generates correction information for correcting the image so that the image is projected to look like a rectangular sheet of paper attached to the three-dimensional projection surface Sp. Subsequently, the projector 100 performs correction processing based on the correction information, to the image to be displayed originally, that is, the image to be displayed in the state where the distortion has been corrected, and projects the processed image onto the projection surface Sp. In the description below, the image to be displayed in the state where the distortion has been corrected is referred to as a display image.

The control unit 10 has one or a plurality of processors. The control unit 10 operates according to a control program stored in the storage unit 11 and thus comprehensively controls operations of the projector 100.

The storage unit 11 has a RAM (random-access memory), which is a volatile memory, and a ROM (read-only memory), which is a non-volatile memory. The RAM is used to temporarily store various data or the like. The ROM stores a control program and control data for controlling operations of the projector 100, or the like. In the storage unit 11 in this embodiment, image data corresponding to the pattern image Ip for measuring the three-dimensional shape of the projection surface Sp is stored. In the description below, the image data corresponding to the pattern image Ip is referred to as pattern image data Dp. Also, image data for display image may be stored in the storage unit 11.

The input operation unit 12 has a plurality of operation keys for the user to give various instructions to the projector 100. An example of the operation keys provided in the input operation unit 12 is a power key, a menu key, and a direction key. The power key is an operation key for switching the power on and off. The menu key is an operation key for displaying a setting menu to make various settings. The direction key is an operation key for selecting an item in the setting menu. When the user operates various operation keys in the input operation unit 12, the input operation unit 12 outputs an operation signal corresponding to the content of the operation by the user to the control unit 10. Thus, the content of the operation by the user is transmitted to the control unit 10. Also, a remote controller, not illustrated, that can remotely operate may be used as the input operation unit 12. In this case, the remote controller outputs an infrared operation signal corresponding to the content of the operation by the user, and a remote control signal receiving unit, not illustrated, receives this operation signal and outputs the received operation signal to the control unit 10.

The image information input unit 13 is coupled to an external image supply device, not illustrated, such as a computer or image playback device, and receives image information for display image supplied from the image supply device. The image information input unit 13 can also receive image information stored in the storage unit 11 that is supplied from the control unit 10. A specific example of the image information supplied from the control unit 10 to the image information input unit 13 is the pattern image data Dp and the image data for display image. The image information input unit 13, under the control of the control unit 10, performs various kinds of processing according to need on the image information supplied from the image supply device or the control unit 10 and outputs the processed image information to the image information correction unit 14. A specific example of the processing performed on the image information by the image information input unit 13 is resolution conversion processing and image quality adjustment processing.

The image information correction unit 14, under the control of the control unit 10, corrects a distortion of an image due to the three-dimensional shape of the projection surface Sp or the like. Specifically, the image information correction unit 14 performs correction processing based on correction information inputted from the control unit 10, on the image information inputted from the image information input unit 13, and outputs corrected image information, which is the processed image information, to a light valve drive unit 24 of the image projection unit 15.

The image projection unit 15 has a light source 21, three liquid crystal light valves 22R, 22G, and 22B as light modulation devices, a projection lens 23 as a projection system, and the light valve drive unit 24. The image projection unit 15 modulates light emitted from the light source 21 by liquid crystal light valves 22R, 22G, and 22B to form image light, then projects the image light from the projection lens 23, and thus displays an image on the projection surface Sp. The image projection unit 15 is an example of a projection device according to the present disclosure.

The light source 21 includes a discharge-type light source lamp such as an ultra-high-pressure mercury lamp or metal halide lamp, or a solid-state light source such as a light-emitting diode or semiconductor laser. The light emitted from the light source 21 is converted into light having substantially uniform luminance distribution by an optical integration system, not illustrated, and is separated into color light components of the primary colors of light, that is, red, green, and blue, by a color separation system, not illustrated. The red light component becomes incident on the liquid crystal light valve 22R. The green light component becomes incident on the liquid crystal light valve 22G. The blue light component becomes incident on the liquid crystal light valve 22B.

Each of the liquid crystal light valves 22R, 22G, and 22B is formed of a transmission-type liquid crystal panel having a pair of transparent substrates with a liquid crystal contained between these substrates. In each liquid crystal panel, a rectangular image forming area Ai formed of a plurality of pixels arranged in a matrix is formed. A drive voltage can be applied to the liquid crystal at each pixel.

The light valve drive unit 24 forms an image in the image forming area Ai in each of the liquid crystal light valves 22R, 22G, and 22B. Specifically, the light valve drive unit 24 applies a drive voltage corresponding to the image information inputted from the image information correction unit 14 to each pixel in the image forming area Ai and thus sets each pixel to a light transmittance corresponding to the image information. The light emitted from the light source 21 is transmitted through the image forming area Ai in the liquid crystal light valves 22R, 22G, and 22B, is thus modulated for each pixel, and forms image light corresponding to the image information for each color light. The resulting image light of the respective colors is combined together for each pixel by a light combining system, not illustrated, to become image light representing a color image. This image light is projected in an enlarged form onto the projection surface Sp by the projection lens 23. Thus, an image based on the image information is displayed on the projection surface Sp.

The measuring unit 16 operates under the control of the control unit 10 and measures the three-dimensional shape of the projection surface Sp. The measuring unit 16 has an image pickup unit 17 for picking up an image of the pattern image Ip. The image pickup unit 17 is a camera having an image pickup element such as a CCD (charge-coupled device) sensor or CMOS (complementary metal oxide semiconductor) sensor. In FIG. 1, the image pickup element is not illustrated. The image pickup unit 17 picks up an image of the pattern image Ip projected on the projection surface Sp from the image projection unit 15 and generates picked-up image information representing the picked-up image. The image pickup unit 17 is an example of an image pickup device according to the present disclosure.

The measuring unit 16 measures the three-dimensional shape of the projection surface Sp, based on the picked-up image information generated by the image pickup unit 17. Specifically, the measuring unit 16 detects a plurality of reference points from the pattern image Ip included in the image based on the picked-up image information, that is, the picked-up image by the image pickup unit 17, and derives three-dimensional coordinates of each reference point. The measuring unit 16 is an example of a measuring device according to the present disclosure. The measuring unit 16 outputs the derived three-dimensional coordinates of each reference point, as the result of measurement, to the correction information generation unit 18.

The correction information generation unit 18 operates under the control of the control unit 10 and generates correction information for correcting a distortion of an image corresponding to the three-dimensional shape of the projection surface Sp, based on the result of measurement by the measuring unit 16. The correction information generation unit 18 outputs the generated correction information to the control unit 10. The correction information generation unit 18 and the image information correction unit 14 are an example of a correction device according to the present disclosure.

The image information input unit 13, the image information correction unit 14, the measuring unit 16, and the correction information generation unit 18 may be formed of one or a plurality of processors or the like, or may be formed of a dedicated processing device such as an ASIC (application-specific integrated circuit) or FPGA (field-programmable gate array).

Figure 2:
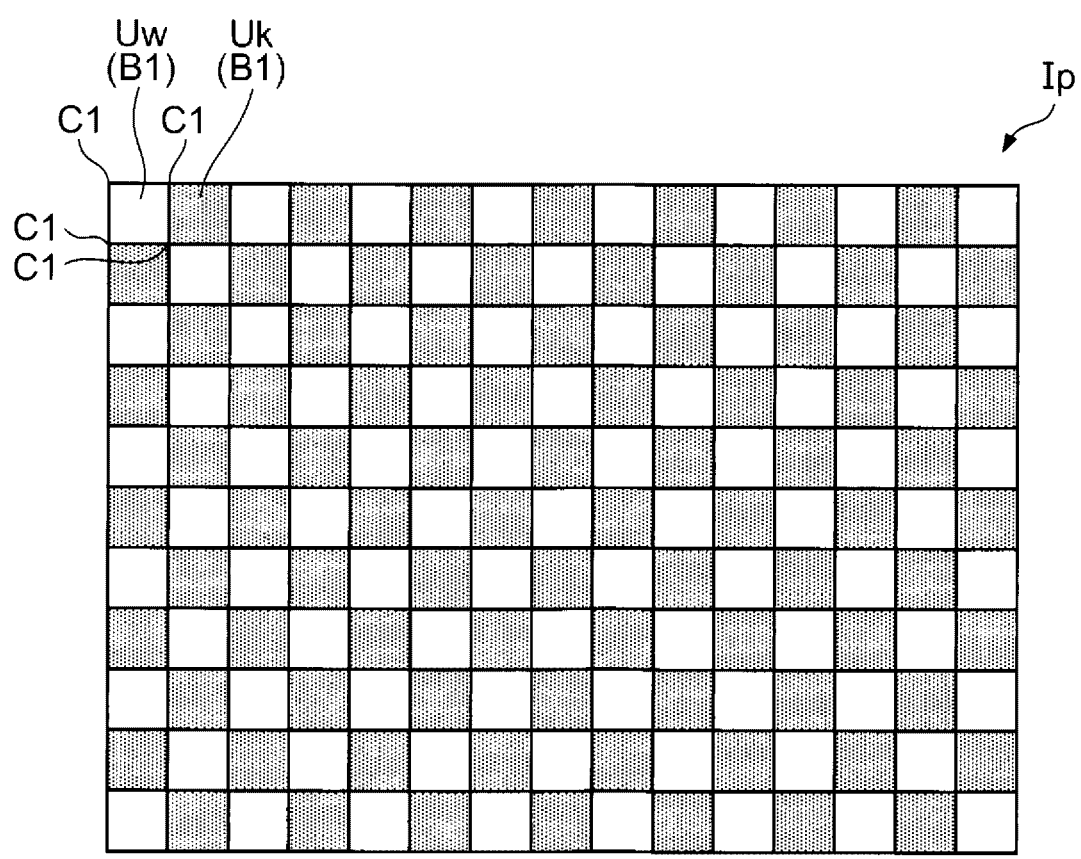
FIG. 2 shows an example of a pattern image Ip for measuring the three-dimensional shape of a projection surface Sp.

FIG. 2 shows an example of the pattern image Ip for measuring the three-dimensional shape of the projection surface Sp. The pattern image Ip is a rectangular image formed in the image forming area Ai. As shown in FIG. 2, the pattern image Ip is an image where white unit patterns Uw and black unit patterns Uk are arranged into a 15×11 matrix. All the white unit patterns Uw and black unit patterns Uk are congruent rectangles. In the pattern image Ip, the white unit patterns Uw and the black unit patterns Uk are arranged in a checkered pattern so that unit patterns of the same color are not vertically or horizontally adjacent to each other.

The measuring unit 16 detects the vertices of the white unit pattern Uw, that is, the corners of the white unit pattern Uw as reference points C1 from the pattern image Ip picked up by the image pickup unit 17. In the rectangular pattern image Ip, the reference points C1 are arranged in a 16×12 matrix. Here, the pattern image Ip can be regarded as a grid-like image formed by the contour line of each white unit pattern Uw and each black unit pattern Uk. In this case, the pattern image Ip includes a plurality of horizontal lines, which are parallel straight lines, and a plurality of vertical lines, which are parallel straight lines orthogonal to the horizontal lines. The points of intersection of these lines, that is, the points of intersection on the grid, are the reference points C1. An axis parallel to the plurality of horizontal lines is an example of a first axis according to the present disclosure. An axis parallel to the plurality of vertical lines is an example of a second axis according to the present disclosure. In the description below, in some cases, the first axis is referred to as a horizontal axis and the second axis is referred to as a vertical axis. In the rectangular pattern image Ip, grid intervals along the vertical axis, that is, the intervals between the reference points C1 along the vertical axis, are equal, and grid intervals along the horizontal axis, that is, the intervals between the reference points C1 along the horizontal axis, are equal, too. A grid angle, that is, the angle formed by a vertical line and a horizontal line, is a right angle. An area corresponding to a white unit pattern Uw or a black unit pattern Uk, that is, a rectangular area having vertices at four reference points C1 that vertically, horizontally, and obliquely next to each other, is referred to as a block B1 in some cases.

Operations of the projector 100 will now be described.

Figure 3:
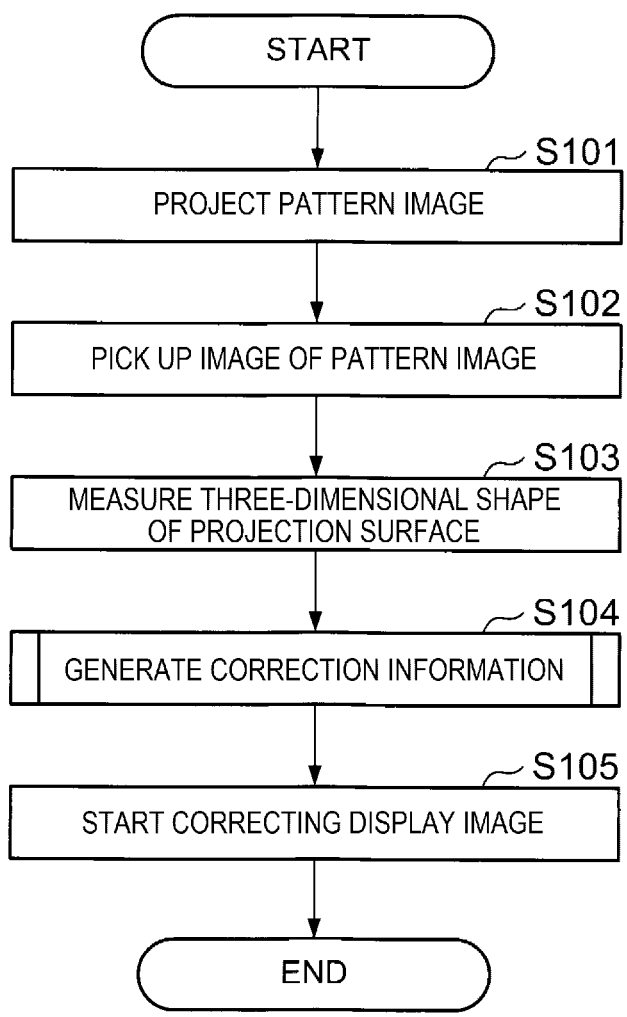
FIG. 3 is a flowchart showing the flow of an operation of the projector 100 when performing distortion correction.
Figure 4:
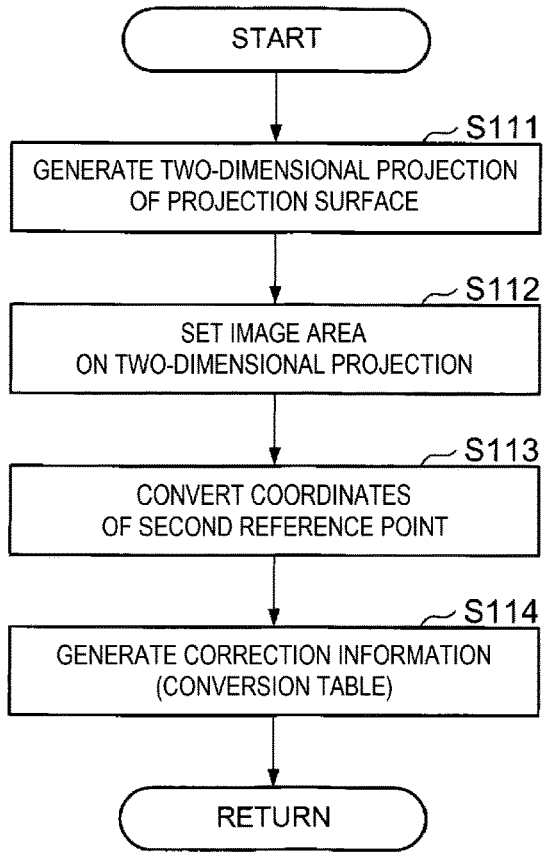
FIG. 4 is a flowchart showing the flow of an operation of the projector 100 when performing distortion correction.

FIGS. 3 and 4 are flowcharts showing the flow of an operation of the projector 100 when performing distortion correction, that is, the flow of the control method for the image projection system according to the present disclosure. As the user operates the input operation unit 12 of the projector 100 to give an instruction to start distortion correction, the control unit 10 of the projector 100 operates according to the flowchart shown in FIG. 3.

In step S101 in FIG. 3, the control unit 10 causes the image projection unit 15 to project the pattern image Ip shown in FIG. 2. Specifically, the control unit 10 reads out the pattern image data Dp from the storage unit 11 and outputs the read-out pattern image data Dp to the image information input unit 13. The control unit 10 also instructs the image information correction unit 14 not to perform correction processing. Thus, the pattern image Ip is formed over the entirety of the image forming area Ai and the pattern image Ip is projected onto the projection surface Sp. When the projection surface Sp is not a plane, the pattern image Ip is displayed as distorted on the projection surface Sp.

In step S102, the control unit 10 instructs the measuring unit 16 to cause the image pickup unit 17 to pick up an image of the pattern image Ip projected on the projection surface Sp.

Figure 5:
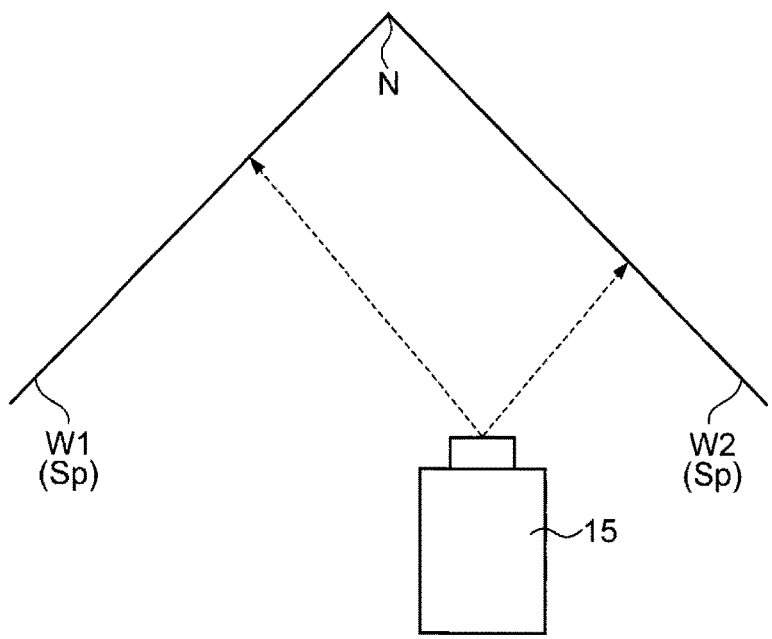
FIG. 5 shows an example of a plan view of the projection surface Sp that is vertically arranged, as viewed from above.
Figure 6:
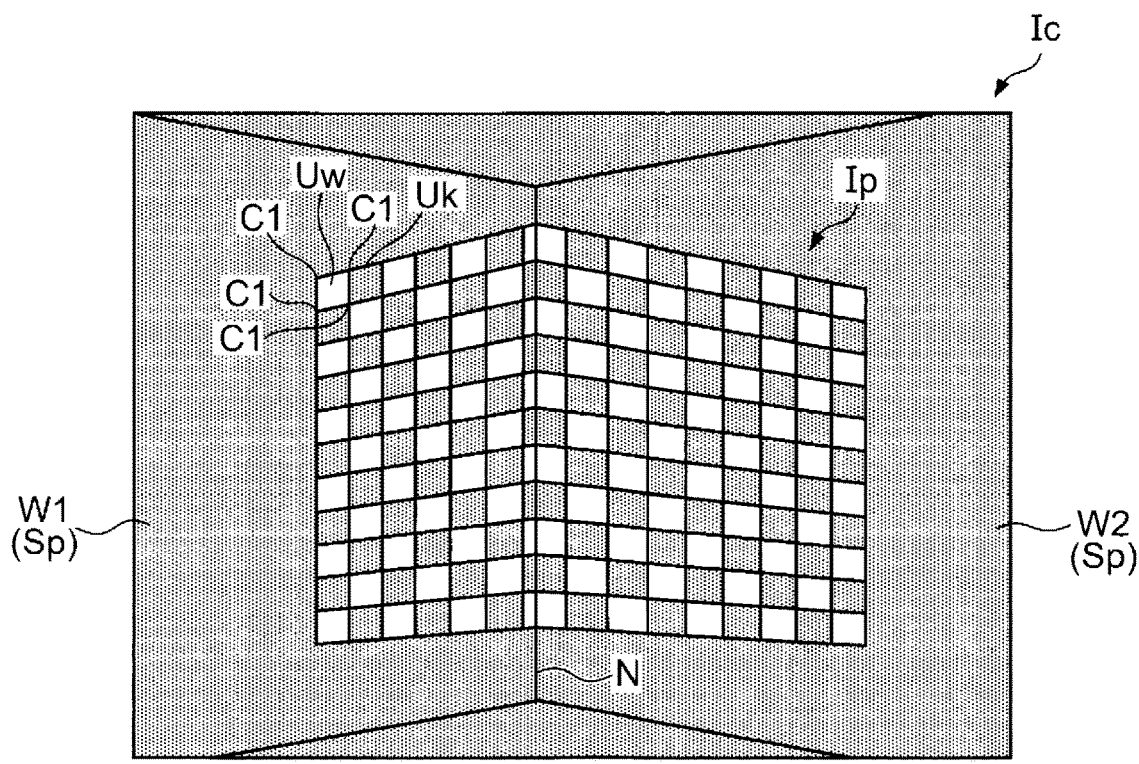
FIG. 6 shows an example of a picked-up image Ic picked up by an image pickup unit 17.

For example, it is assumed that a plane W1 and a plane W2, which are two wall surfaces, intersect at a right angle, and that an image is projected within a range including a corner N recessed into the direction of depth as viewed from the image projection unit 15, as shown in FIG. 5. FIG. 5 is a plan view of the projection surface Sp that is vertically arranged, as viewed from above. In the example shown in FIG. 5, the two planes W1 and W2 intersecting at a right angle form the projection surface Sp. In this case, the distance from the image projection unit 15 to the projection surface Sp becomes longer as it gets closer to the corner N. FIG. 6 shows a picked-up image Ic picked up by the image pickup unit 17. As shown in FIG. 6, the pattern image Ip projected from the image projection unit 15 onto the projection surface Sp is projected as distorted in such a way that the image becomes more enlarged as it gets closer to the corner N. An image of the pattern image Ip displayed as distorted in this way is picked up as the picked-up image Ic by the image pickup unit 17.

Back to FIG. 3, in step S103, the control unit 10 gives the measuring unit 16 an instruction to measure the three-dimensional shape of the projection surface Sp, based on the picked-up image Ic picked up by the image pickup unit 17. On receiving the instruction from the control unit 10, the measuring unit 16 detects a plurality of reference points C1 from the pattern image Ip included in the picked-up image Ic. The coordinates of each reference point C1 in the rectangular pattern image Ip are already known and stored in the storage unit 11 in advance. In the description below, the coordinates of each reference point C1 stored in the storage unit 11 are referred to as reference coordinates. The measuring unit 16 derives the three-dimensional coordinates of the reference point C1 on the projection surface Sp by the principle of triangulation based on the correspondence between the detected coordinates of the reference point C1, that is the coordinates of the reference point C1 in the picked-up image Ic, and the reference coordinates stored in the storage unit 11. The measuring unit 16 can find three-dimensional coordinates, taking the origin at the principal point of an image pickup lens, not illustrated, in the image pickup unit 17. Based on these three-dimensional coordinates, the three-dimensional shape of the projection surface Sp and a distortion of the image on the projection surface Sp can be recognized.

In step S104, the control unit 10 gives the correction information generation unit 18 an instruction to generate correction information for correcting the distortion due to the three-dimensional shape of the projection surface Sp, based on the derived three-dimensional coordinates of the reference point C1. On receiving the instruction, the correction information generation unit 18 operates according to the flow shown in FIG. 4 and starts generating correction information.

As shown in FIG. 4, in step S111, the correction information generation unit 18 generates a two-dimensional projection formed by flattening out, onto a single plane, the three-dimensional projection surface Sp where the reference point C1 is arranged, based on the three-dimensional coordinates of the reference point C1 derived by the measuring unit 16.

Figure 7:
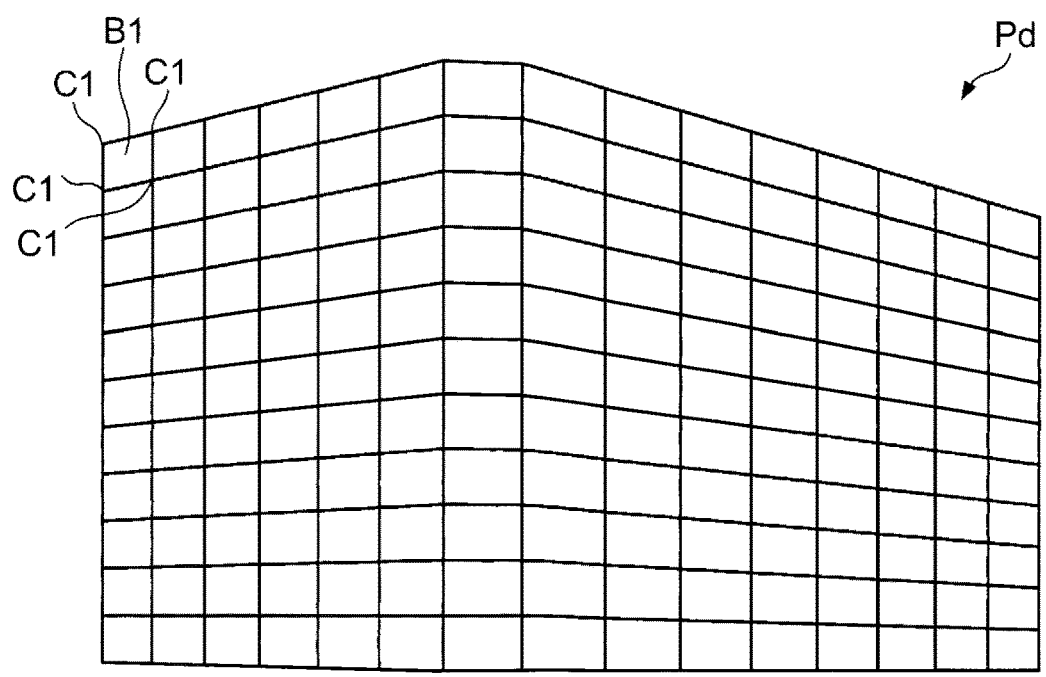
FIG. 7 shows an example of a two-dimensional projection Pd generated by a correction information generation unit 18.

FIG. 7 shows an example of a two-dimensional projection Pd generated by the correction information generation unit 18 when the two planes W1 and W2 intersecting at a right angle are the projection surface Sp as shown in FIG. 5. As shown in FIG. 7, the two-dimensional projection Pd is a virtual drawing showing the positional relationship of the reference point C1 on the projection surface Sp where the pattern image Ip is projected, and showing a distortion of the pattern image Ip on the projection surface Sp. In FIG. 7, for the sake of convenience, the reference points C1 next to each other along the vertical axis and the horizontal axis are coupled together by straight lines. That is, the two-dimensional projection Pd includes a plurality of rectangular blocks B1 corresponding to the unit pattern Uw and the unit pattern Uk in the pattern image Ip, with a vertex of each block B1 being a reference point C1. On the two-dimensional projection Pd, the length of a side of each block B1, that is, the distance between reference points C1 that are next to each other, is equal to the length of a side of the corresponding unit pattern Uw or the corresponding unit pattern Uk on the projection surface Sp. The angle of a vertex of each block B1 on the two-dimensional projection Pd equal to the angle of a vertex of the corresponding unit pattern Uw or the corresponding unit pattern Uk on the projection surface Sp.

Figure 8:
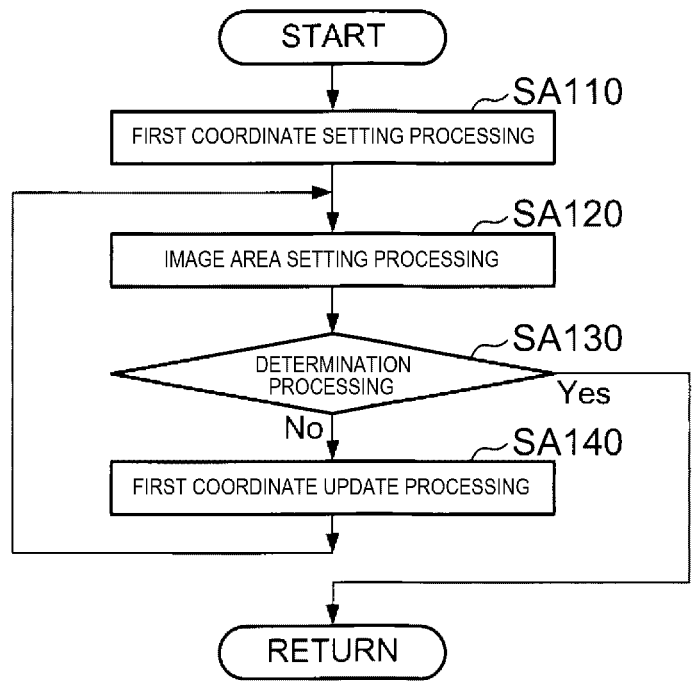
FIG. 8 is a flowchart showing the flow of a control method for setting an image area As in the two-dimensional projection Pd.
Figure 9:
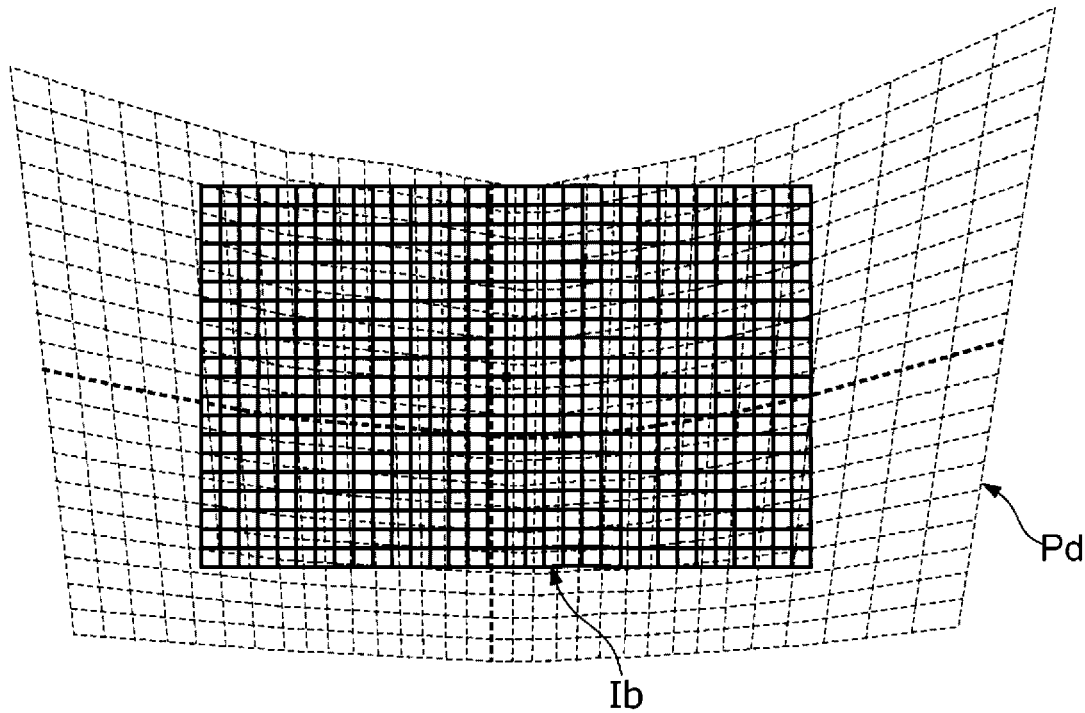
FIG. 9 explains an operation of the correction information generation unit 18.

Next, in step S112, the correction information generation unit 18 sets an image area for forming a display image, on the generated two-dimensional projection Pd. The image area is an area having the original shape of the display image, that is, a rectangular area similar to the image forming area Ai. The position and size of the image area may be set in such a way that the image area is as large as possible without extending out of the two-dimensional projection Pd. A characteristic of this embodiment is in a control method that sets as large an image area as possible without extending out of the two-dimensional projection Pd. FIG. 8 is a flowchart showing the flow of a control method for setting an image area. As shown in FIG. 8, this control method includes first coordinate setting processing SA110, image area setting processing SA120, determination processing SA130, and first coordinate update processing SA140. The content of each piece of processing in FIG. 8 will now be described, taking a case example where the two-dimensional projection Pd of the projection surface Sp curved in the direction of depth as viewed from the projector 100 as shown in FIG. 9 is generated. A reference sign Ib in FIGS. 9 to 13 represents a rectangular image corresponding to the image forming area Ai.

In the first coordinate setting processing SA110, the correction information generation unit 18 sets first coordinates serving as a reference position for setting an image area, on the two-dimensional projection Pd formed by flattening out the three-dimensional projection surface Sp onto a plane. A specific example of the first coordinates is the coordinates of the center position of the two-dimensional projection Pd or the coordinates of the centroid position of the two-dimensional projection Pd. In this embodiment, when the coordinate on the horizontal axis of the first coordinates is X0 and the coordinate on the vertical axis is Y0, X0 and Y0 are set in the following manner. That is, X0=(the maximum coordinate value in the horizontal direction on the two-dimensional projection Pd+the minimum coordinate value in the horizontal direction on the two-dimensional projection Pd)/2, and Y0=(the maximum coordinate value in the vertical direction on the two-dimensional projection Pd+the minimum coordinate value in the vertical direction on the two-dimensional projection Pd)/2. That is, the first coordinates in this embodiment are the coordinates of the center position of the two-dimensional projection Pd. Which of the coordinates of the center position and the coordinates of the centroid position of the two-dimensional projection Pd is preferable as the first coordinates depends on the shape of the entirety of the two-dimensional projection Pd. Thus, the user of the projector 100 may be able to designate which of the coordinates of the center position and the coordinates of the centroid position are the first coordinates according to the shape of the entirety of the two-dimensional projection Pd.

In the image area setting processing SA120, the correction information generation unit 18 arranges a first quadrilateral having an aspect ratio designated by the user within the two-dimensional projection Pd, based on the first coordinates as a reference position, in such a way that the first quadrilateral comes into contact with an outline of the two-dimensional projection Pd. In this embodiment, the first quadrilateral arranged within the two-dimensional projection Pd by the image area setting processing SA120 is a candidate for the image area. For the user to designate an aspect ratio, various forms of designation can be applied. The user may designate an aspect ratio that is the same as the aspect ratio of the image represented by the image information inputted to the image information input unit 13 or may designate an aspect ratio that is different from the aspect ratio of the image represented by the image information inputted to the image information input unit 13. The aspect ratio designated by the user is an example of a first aspect ratio according to the present disclosure.

Figure 10:
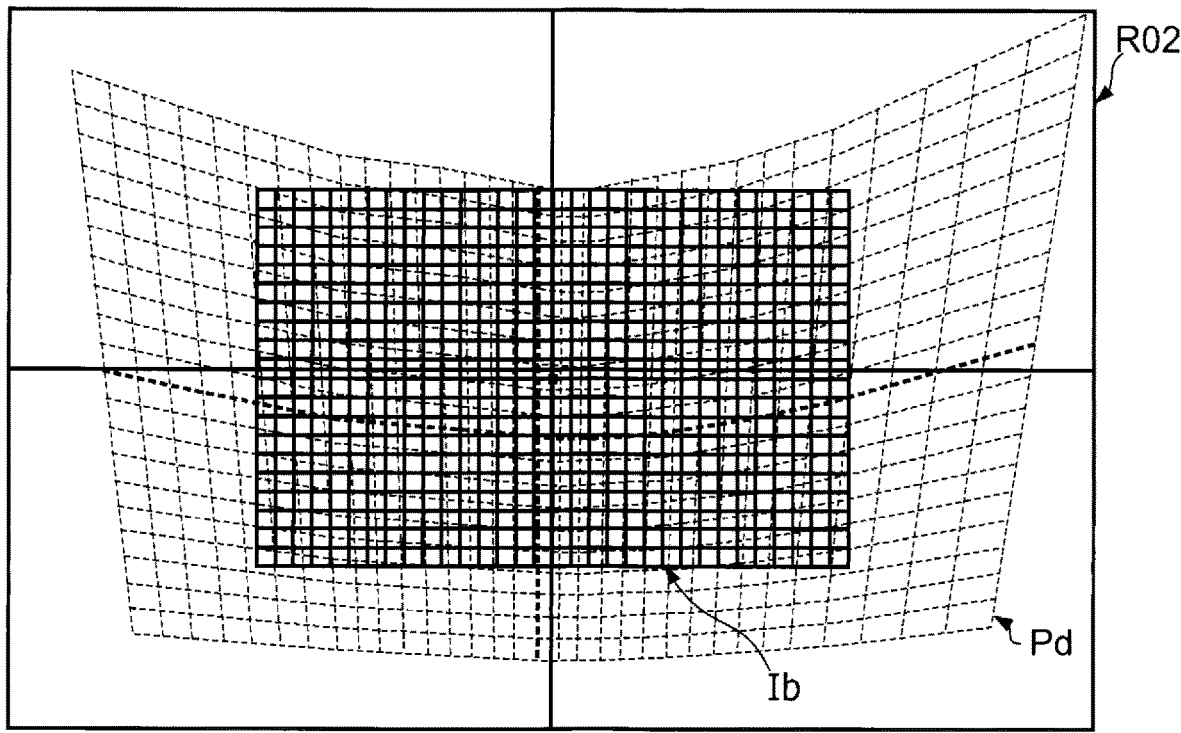
FIG. 10 explains an operation of the correction information generation unit 18.
Figure 11:
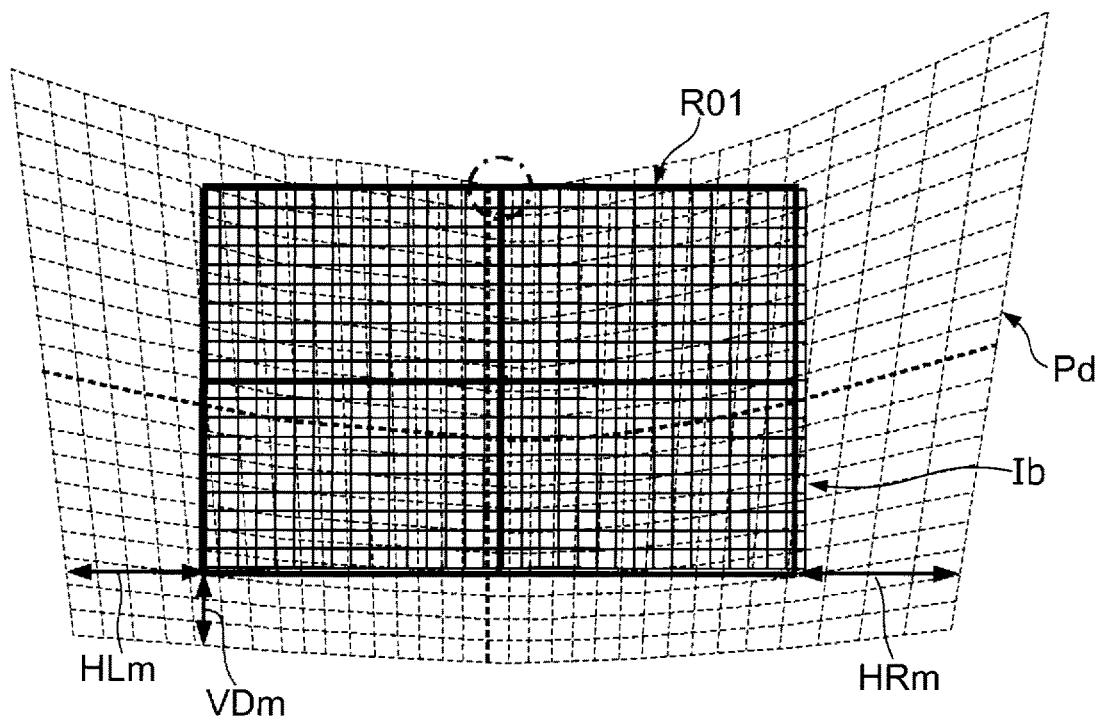
FIG. 11 explains an operation of the correction information generation unit 18.

To explain in more detail, in the image area setting processing SA120, the correction information generation unit 18 first arranges a second quadrilateral R02 having an aspect ratio designated by the user and circumscribing the two-dimensional projection Pd, based on the first coordinates as a reference position, as shown in FIG. 10. Specifically, the correction information generation unit 18 arranges the second quadrilateral R02 in such a way that the center position of the second quadrilateral R02 is at the first coordinates. Next, the correction information generation unit 18 reduces the second quadrilateral R02 until all the outlines thereof fall within the two-dimensional projection Pd while maintaining the aspect ratio designated by the user, and thus generates a first quadrilateral R01, as shown in FIG. 11. The correction information generation unit 18 also calculates the minimum distance between each of the left, right, upper, and lower sides of the first quadrilateral R01 and the outline of the two-dimensional projection Pd. In the example shown in FIG. 11, the minimum horizontal distance on the left side, the minimum horizontal distance on the right side, the minimum vertical distance on the upper side, and the minimum vertical distance on the lower side are HLm, HRm, 0, and VDm, respectively.

In the determination processing SA130, the correction information generation unit 18 determines whether the first quadrilateral arranged in the two-dimensional projection in the image area setting processing SA120 is in contact with the outline of the two-dimensional projection at two or more points, or not. When the result of the determination in the determination processing SA130 is "Yes", that is, when it is determined that the first quadrilateral is in contact with the outline of the two-dimensional projection at two or more points, the correction information generation unit 18 defines the first quadrilateral at the time as the image area and ends this control method. Meanwhile, when the result of the determination in the determination processing SA130 is "No", that is, when it is not determined that the first quadrilateral is in contact with the outline of the two-dimensional projection at two or more points, the correction information generation unit 18 executes the first coordinate update processing SA140 to change the first coordinates, and subsequently executes the image area setting processing SA120 again. That is, when it is determined that the first quadrilateral is not in contact with the outline of the two-dimensional projection at two or more points, the correction information generation unit 18 changes the first coordinates and arranges the first quadrilateral in the two-dimensional projection, based on the changed first coordinates as a reference position, in such a way that the first quadrilateral comes into contact with the outline of the two-dimensional projection. Then, the correction information generation unit 18 determines whether the rearranged first quadrilateral is in contact with the outline of the two-dimensional projection at two or more points, or not.

Figure 12:
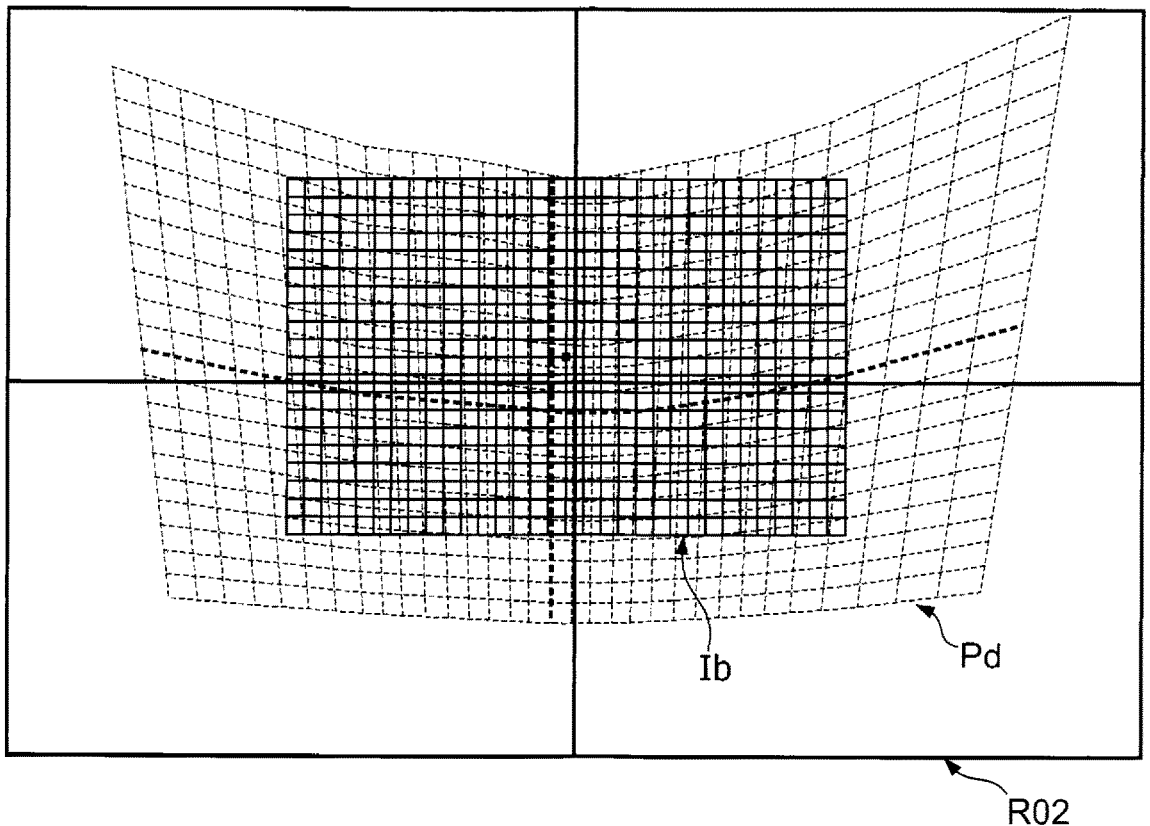
FIG. 12 explains an operation of the correction information generation unit 18.
Figure 13:
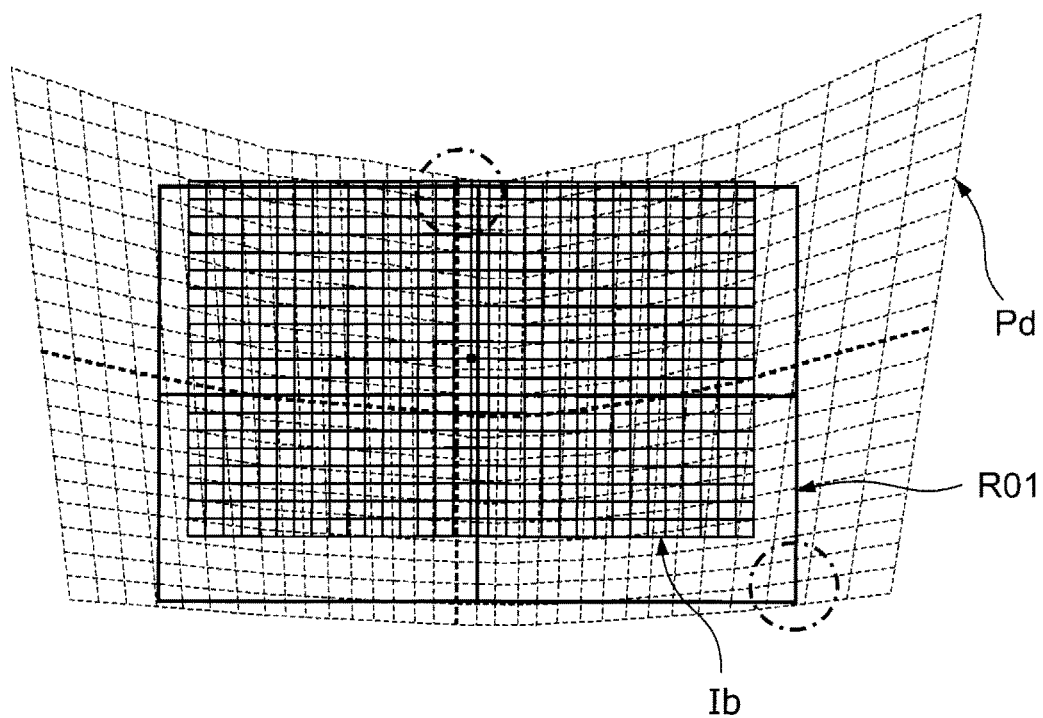
FIG. 13 explains an operation of the correction information generation unit 18.

In the example shown in FIG. 11, the first quadrilateral R01 is in contact with the two-dimensional projection Pd only at one point surrounded by a circle. Therefore, with respect to the first quadrilateral R01 shown in FIG. 11, the result of the determination in the determination processing SA130 is "No" and the first coordinate update processing SA140 is executed. In the first coordinate update processing SA140, the correction information generation unit 18 calculates a minimum distance along the horizontal axis and a minimum distance along the vertical axis between the first quadrilateral and the outline of the two-dimensional projection Pd, and changes the first coordinates, based on the minimum distance along the horizontal axis and the minimum distance along the vertical axis. For example, when the first coordinates before the execution of the first coordinate update processing SA140 are (X0,Y0), the correction information generation unit 18 in the first coordinate update processing SA140 updates the first coordinates to (X0+ΔX, Y0+ΔY). Here, ΔX=(the minimum horizontal distance on the right side−the minimum horizontal distance on the left side)/2 and ΔY=(the minimum vertical distance on the upper side−the minimum vertical distance on the lower side)/2. After the first coordinates are updated in this way, the image area setting processing SA120 is executed again. Therefore, the second quadrilateral R02 is arranged, based on the updated first coordinates as a reference point, as shown in FIG. 12. The second quadrilateral R02 is reduced while the aspect ratio is maintained. Thus, a first quadrilateral is generated again. Then, the determination processing SA130 is performed with respect to the first quadrilateral that is generated again. In this embodiment, the image area setting processing SA120, the determination processing SA130, and the first coordinate update processing SA140 are repeatedly executed until the first quadrilateral R01 comes into contact with the outline of the two-dimensional projection Pd at two or more points, as indicated by a circle in FIG. 13.

Figure 14:
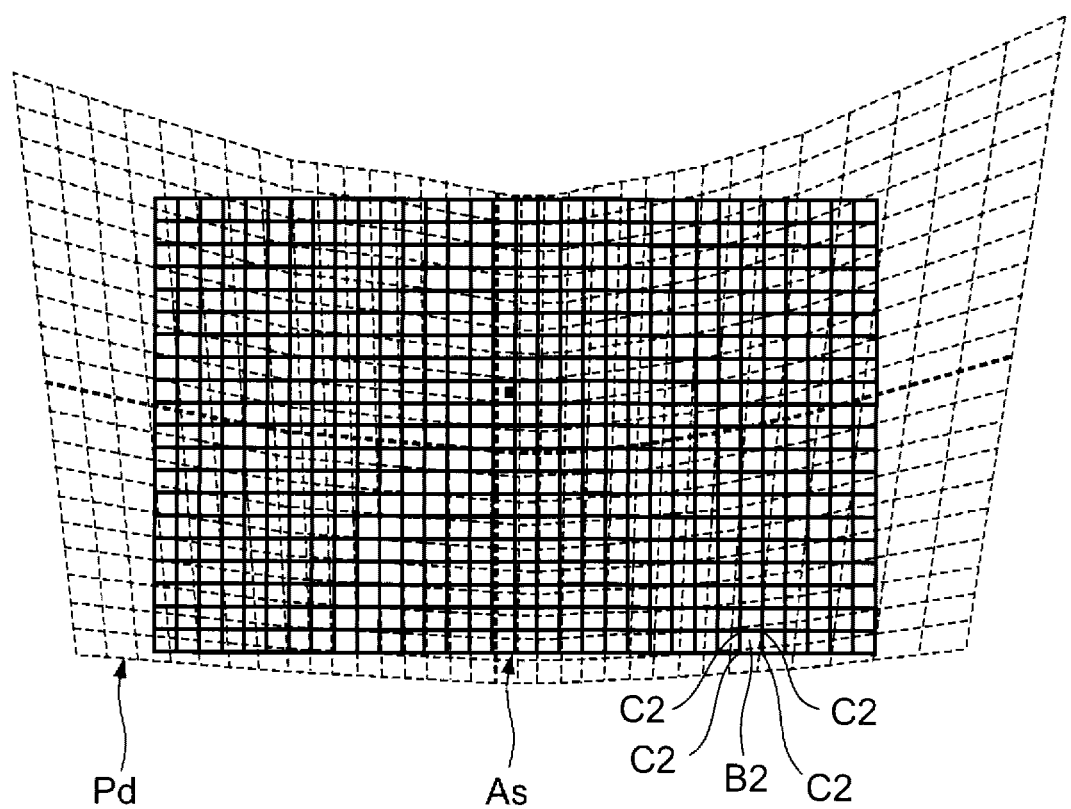
FIG. 14 shows an example of the image area As set in the two-dimensional projection Pd.

FIG. 14 shows an image area As set on the two-dimensional projection Pd. As shown in FIG. 14, the image area As is an area having the original shape of the display image, that is, a rectangular area similar to the image forming area Ai. The position and size of the image area As are decided so as to be as large as possible without extending out of two-dimensional projection Pd. In FIG. 14, for the sake of convenience, a grid pattern corresponding to the pattern image Ip is drawn in the image area As. A rectangular block B2 partitioned by the grid corresponds to the block B1 in the rectangular pattern image Ip. Grid intervals along each of the vertical axis and the horizontal axis in the image area As are equal intervals, as in the pattern image Ip. The grid angle is a right angle. Points of intersection of the grid in the image area As are reference points C2 corresponding to the reference points C1 in the pattern image Ip. Hereinafter, in some cases, the reference point C1 is referred to as the first reference point C1 and the reference point C2 is referred to as the second reference point C2. In this way, the correction information generation unit 18 arranges a plurality of second reference points C2 in a matrix, in the image area As set on the two-dimensional projection Pd.

Back to FIG. 4, in step S113, the correction information generation unit 18 performs coordinate conversion processing of converting the coordinates of the second reference point C2 on the two-dimensional projection Pd into coordinates on a rectangular image Ib corresponding to the image forming area Ai. In the description below, the rectangular image Ib corresponding to the image forming area Ai is also referred to as a basic image Ib. To explain in more detail, the correction information generation unit 18 derives coordinates of the second reference point C2 as of when the two-dimensional projection Pd where the second reference point C2 is arranged is modified into the shape of the basic image Ib, that is, into a rectangle, based on the correspondence between the coordinates of the first reference point C1 on the rectangular pattern image Ip and the coordinates of the first reference point C1 on the two-dimensional projection Pd. The image area As including the second reference point C2 is arranged as distorted on the basic image Ib by the above coordinate conversion processing. Here, the second reference point C2 on the basic image Ib is equivalent to an image of the second reference point C2 arranged on the two-dimensional projection Pd that is rearranged on the projection surface Sp and observed from the position of the image projection unit 15.

Next, in step S114, the correction information generation unit 18 generates correction information for correcting a distortion, based on the coordinates of the second reference point C2 arranged on the basic image Ib. This correction information is, for example, a conversion table for modifying a display image, based on the coordinates of the four vertices, that is, the four first reference points C1, of each block B1 in the display image divided into a plurality blocks B1, and the coordinates of the four vertices, that is, the four second reference points C2, of the corresponding block B2 in the image area As in the basic image Ib. A specific example of this modification is nomography transformation. The correction information generation unit 18 outputs the generated correction information to the control unit 10. Subsequently, the control unit 10 returns the processing to the flow shown in FIG. 3.

Back to FIG. 3, in step S105, the control unit 10 outputs the inputted correction information to the image information correction unit 14 and causes the image information correction unit 14 to start correction processing of correcting the display image, based on this correction information. From this point onward, the image information correction unit 14 performs correction processing according to correction information, on image information for display image successively inputted from the image information input unit 13. Specifically, the image information correction unit 14 performs processing of forming a display image within the image area As in the basic image Ib and setting an area outside the image area As in black color. Thus, an image based on the corrected image information is projected from the image projection unit 15 and the display image in the state where the distortion has been corrected is displayed on the projection surface Sp. Although the entirety of the image projected from the projector 100 is distorted, the observer visually recognizes only the display image formed within the image area As because the area outside the image area As is set in black color. The image area As is an undistorted rectangular area on the two-dimensional projection Pd and is therefore displayed on the actual projection surface Sp in a form that looks like a rectangular sheet of paper attached along the projection surface Sp.

Figure 15:
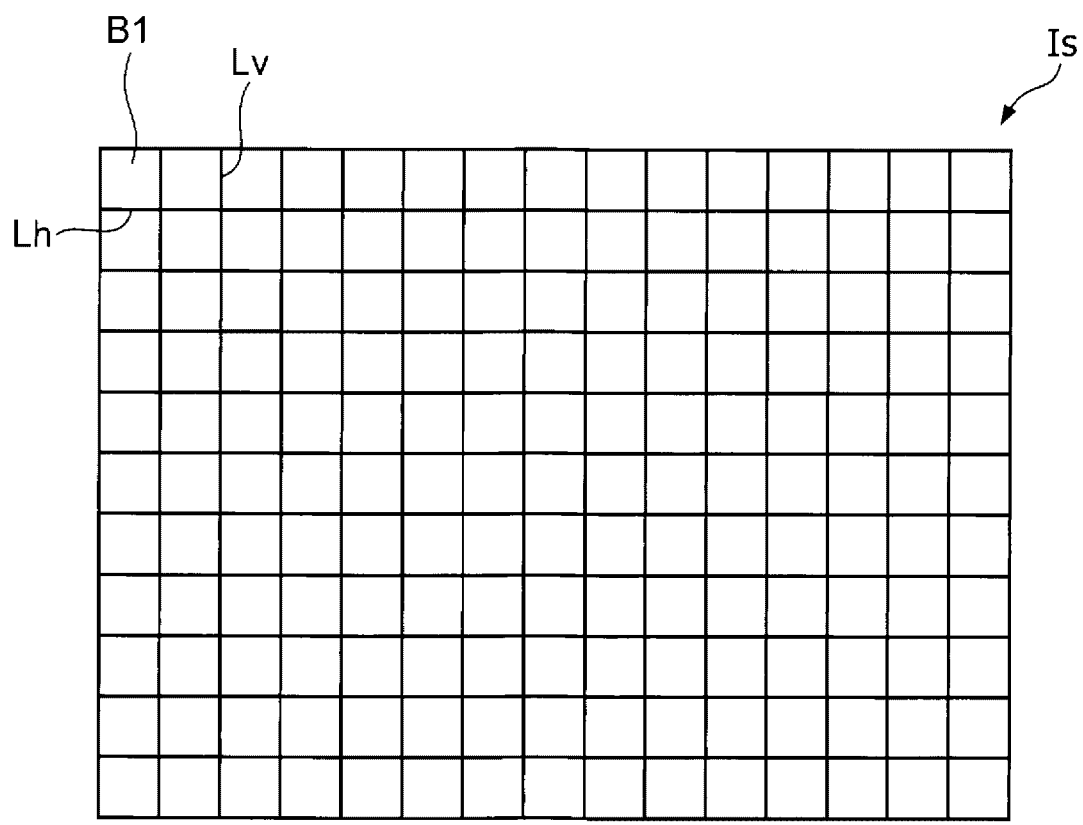
FIG. 15 shows an example of a display image Is.

FIG. 15 shows an example of a display image Is. As shown in FIG. 15, the display image Is is a rectangular image and includes a grid pattern where a plurality of vertical lines Lv arranged in parallel and at equal intervals and a plurality of horizontal lines Lh similarly arranged in parallel and at equal intervals orthogonally intersect each other. The display image Is corresponds to the pattern image Ip in FIG. 2 and includes a plurality of rectangular blocks B1 arranged in a matrix. All the blocks B1 are congruent. Therefore, an interval ratio, which is the ratio of the length of a side of each block B1 to the length of a side of a reference block B1 such as the block B1 in the top left corner, is 1 in both the horizontal direction and the vertical direction with respect to all the blocks B1. The angles of the vertices of all the blocks B1, that is, all the grid angles, are right angles.

When the image information representing this display image Is is inputted to the image information input unit 13, the above correction processing is performed by the image information correction unit 14 and the display image Is in the state where the distortion has been corrected is projected from the image projection unit 15 onto the projection surface Sp. On the projection surface Sp, the grid interval is equal in both the horizontal direction and the vertical direction, and the grid angle, that is, the angle formed by the horizontal line Lh and the vertical line Lv, is a right angle. That is, by the above correction processing, the interval ratio of the blocks B1 of 1 is maintained even on the projection surface Sp, and the right angle of the vertices of the blocks B1 is maintained even on the projection surface Sp.

Generally, an image projected on the three-dimensional projection surface Sp is observed as distorted according to the position of the observer. However, when the interval ratio and angle of each block B1 forming the display image are maintained on the projection surface Sp, the image is observed by the observer in a form that looks like a printed matter attached along the projection surface Sp and therefore the impression of the image being unnatural is reduced. Also, a configuration to maintain only one of the interval ratio and the angle may be employed.

As described above, the projector 100 according to this embodiment achieves the following effects.

(1) In the projector 100 according to this embodiment, when image information representing a grid pattern where a plurality of vertical lines arranged at equal intervals and in parallel and a plurality of horizontal lines arranged at equal intervals and in parallel orthogonally intersect each other is inputted, the image information correction unit 14 corrects the image information in such a way that the interval ratio and angle of the grid are maintained on the three-dimensional projection surface Sp, that is, in such a way that the grid lines are arranged at equal intervals and at a right angle. Therefore, the impression of the image being unnatural to the observer is restrained regardless of the position of the observer.

(2) In the projector 100 according to this embodiment, the correction information generation unit 18 sets the image area As having the original shape, that is, a rectangular shape, in the two-dimensional projection Pd, converts the coordinates of the second reference point C2 in the image area As, based on the coordinates of the first reference point C1 on the two-dimensional projection Pd, and generates correction information based on the coordinates of the second reference point C2 after the coordinate conversion. Thus, the projector 100 can correct the image so as to have the original shape on the two-dimensional projection Pd. Therefore, even on the three-dimensional projection surface Sp, the impression of the image being unnatural to the observer is restrained regardless of the position of the observer.

(3) In the projector 100 according to this embodiment, the correction information generation unit 18 sets the image area for forming a display image, to be as large as possible without extending out of the two-dimensional projection Pd.

Thus, an undistorted image can be projected with as large a screen size as possible on the three-dimensional projection surface.

(4) In the projector 100 according to this embodiment, the measuring unit 16 picks up by the image pickup unit 17 an image of the pattern image Ip projected from the image projection unit 15 and thus measures the three-dimensional shape of the projection surface Sp. Therefore, there is no need to provide a dedicated device for measuring the three-dimensional shape.

(5) In the projector 100 according to this embodiment, the image projection unit 15 and the measuring unit 16 are formed as a unified structure. Therefore, there is no need to adjust the arrangement of the image projection unit 15 and the measuring unit 16 each time.

2. Modification Examples

The embodiment may also be changed in the following manner.

In the embodiment, the measuring unit 16 picks up by the image pickup unit 17 an image of the pattern image Ip projected from the image projection unit 15 and thus measures the three-dimensional shape of the projection surface Sp. However, this configuration is not limiting. For example, a configuration having a three-dimensional measuring device that can measure the three-dimensional shape of the projection surface Sp, instead of the measuring unit 16, may be employed. As the three-dimensional measuring device, a system projecting structured light, a TOF (time-of-flight) system or the like can be employed. The system projecting structured light may be configured to project structured light from the image projection unit 15 as in the above embodiment or may be configured to project structured light from a projection device provided in the three-dimensional measuring device.

As the configuration where structured light is projected from a projection device other than the image projection unit 15, a configuration where structured light of invisible light (for example, infrared light) is projected can be employed. In this case, the projected structured light is not observed by the observer. Therefore, the measurement of the three-dimensional shape can be performed so as to update correction information during the projection of the display image. Meanwhile, in the configuration where the three-dimensional shape is measured by the TOF system, the measurement of the three-dimensional shape can be performed so as to update correction information during the projection of the display image, as in the foregoing case, and there is no need to provide a projection device for projecting invisible light.

In the configuration having the three-dimensional measuring device, the three-dimensional coordinates of the reference point C1 as of when the pattern image Ip is projected from the image projection unit 15 can be calculated, based on the measured three-dimensional shape of the projection surface Sp and the positional relationship between the image projection unit 15 and the three-dimensional measuring device. Therefore, there is no need to actually project the pattern image Ip. Similarly, even in a configuration having the image projection unit 15 and the image pickup unit 17 as in the above embodiment, for example, when the image projection unit 15 projects structured light and the image pickup unit 17 picks up an image of the structured light so as to recognize the three-dimensional shape of the projection surface Sp, the three-dimensional coordinates of the reference point C1 as of when the pattern image Ip is projected from the image projection unit 15 can be calculated, based on the positional relationship between the image projection unit 15 and the image pickup unit 17. Therefore, in the case of this configuration, there is no need to actually project the pattern image Ip.

In the embodiment, a configuration where an image is projected on the projection surface Sp having the recessed corner N and a configuration where an image is projected on the projection surface Sp curved into the direction of depth as viewed from the projector 100 are described. However, the three-dimensional shape of the projection surface Sp is not limited to the above shape, provided that it is a shape that can be flattened out on a plane without being cut open. For example, the projection surface Sp may have a protruding corner, may be curved in a circular columnar shape, or may be distorted in a wave-like shape or the like. In the embodiment, when the projection surface Sp has the corner N or when the projection surface Sp has a curved part, the grid interval and the grid angle may differ at the corner N or the curved part and this may cause inconsistency between reference points. In this case, the difference can be reduced by making a suitable correction as described above or by reducing the interval between the reference points C1 in the pattern image Ip.

In the embodiment, the image projection unit 15 projects the pattern image Ip where a plurality of rectangular unit patterns Uw and unit patterns Uk are arranged in a matrix, and the measuring unit 16 detects the vertices of the rectangular unit patterns Uw, that is, points of intersection in the grid, as the reference point C1. However, the reference point C1 is not limited to the vertices of the unit patterns Uw. For example, the image projection unit 15 may project a pattern image where a plurality of unit patterns having a luminance distribution are arranged, and the measuring unit 16 may detect a maximum luminance position or a minimum luminance position of each unit pattern as the reference point C1. The measuring unit 16 may also detect the centroid position of a plurality of geometric shapes arranged within a pattern image, as the reference point C1.

In the embodiment, the projector 100 having individual components such as the image projection unit 15 and the measuring unit 16 as a unified structure is described. However, a part or all of the components may be separated. In a configuration where the image projection unit 15 and the measuring unit 16 are separated, the arrangement state of each of these units changes every time installation is carried out. Therefore, calibration needs to be performed each time. The calibration refers to processing of associating coordinates on the rectangular pattern image Ip with coordinates on the picked-up image Ic.

In the embodiment, the transmission-type liquid crystal light valves 22R, 22G, and 22B are used as the light modulation devices. However, a reflection-type light modulation device such as a reflection-type liquid crystal light valve can be used. Also, a digital mirror device that controls the direction of exit of incident light for each micromirror as a pixel and thus modulates the light emitted from the light source 21, or the like, can be used. Also, the configuration having a plurality of light modulation devices corresponding to individual color light beams is not limiting. A configuration where a single light modulation device modulates a plurality of color light beams in time series may be employed.

In the embodiment, the second quadrilateral having the first aspect ratio and circumscribing the two-dimensional projection Pd is arranged, based on the first coordinates as a reference position, and the first quadrilateral is generated by reducing the second quadrilateral while maintaining the first aspect ratio. However, a second quadrilateral having the first aspect ratio and small enough to be included within the two-dimensional projection Pd may be arranged, based on the first coordinates as a reference position, and the first quadrilateral may be generated by enlarging the second quadrilateral while maintaining the first aspect ratio. In the latter case, the second quadrilateral cannot be easily set in an appropriate size. When the second quadrilateral is too small, the processing load for the processing of gradually enlarging the second quadrilateral to achieve the first quadrilateral increases. Therefore, the configuration in the above embodiment may be employed.

The projector 100 according to the embodiment has the image projection unit 15, that is, one projection device. However, the projector 100 may include a first projection device and a second projection device. In this case, the projection surface is acquired by coupling together a first projection surface where an image is projected by the first projection device and a second projection surface where an image is projected by the second projection device.

3. Aspect Grasped from at Least One of Embodiment and Modification Examples

The present disclosure is not limited to the foregoing embodiment and modification examples and can be implemented with various other aspects without departing from the spirit and scope of the present disclosure. For example, the present disclosure can be implemented according to the aspects described below. A technical feature in the embodiment corresponding to a technical feature in each of the aspects described below can be suitably replaced or combined with another in order to solve a part or all of the foregoing problems or in order to achieve a part or all of the foregoing effects. The technical feature can be suitably deleted unless described as essential in this specification.

According to an aspect of the present disclosure, a control method for an image projection system includes first coordinate setting processing, image area setting processing, and determination processing as described below. In the first coordinate setting processing, a first coordinate is set in a two-dimensional projection formed by flattening out a three-dimensional projection surface onto a plane. In the image area setting processing, a first quadrilateral having a first aspect ratio is set as an image area within the two-dimensional projection, based on the first coordinate as a reference position, in such a way that the first quadrilateral comes into contact with an outline of the two-dimensional projection. In the determination processing, whether the first quadrilateral is in contact with the outline of the two-dimensional projection at two or more points, or not, is determined. In the control method for the image projection system according to the present disclosure, when the first quadrilateral is determined as being in contact with the outline of the two-dimensional projection at two or more points, image information is corrected based on the first quadrilateral, thus generating corrected image information, and an image based on the corrected image information is projected onto the projection surface. According to this aspect, an image area for forming a display image is set to be as large as possible without extending out of the two-dimensional projection. Thus, an undistorted image can be projected with as large a screen size as possible on the three-dimensional projection surface.

According to another aspect, in the control method, when the first quadrilateral is determined as not being in contact with the outline of the two-dimensional projection at two or more points, first coordinate update processing of changing the first coordinate may be executed and the image area setting processing and the determination processing may be executed again. A specific form of the first coordinate update processing may be calculating a minimum distance along a first axis and a minimum distance along a second axis intersecting the first axis between the first quadrilateral and the outline of the two-dimensional projection, and changing the first coordinate, based on the minimum distance along the first axis and the minimum distance along the second axis.

According to another aspect, in the control method, a coordinate of a center position of the two-dimensional projection or a coordinate of a centroid position of the two-dimensional projection may be decided as the first coordinate. According to this aspect, an image area for forming a display image can be set to be as large as possible without extending out of the two-dimensional projection, based on the center position or the centroid position of the two-dimensional projection.

According to another aspect, in the control method, in the image area setting processing, a second quadrilateral having the first aspect ratio and circumscribing the two-dimensional projection may be arranged, based on the first coordinate as a reference position, and the first quadrilateral may be generated by reducing the second quadrilateral while maintaining the first aspect ratio. According to this aspect, the processing load is reduced, compared with the case where a sufficiently small second quadrilateral is set and enlarged to generate the first quadrilateral.

According to another aspect, in the control method, a pattern image may be projected on the projection surface, and a three-dimensional shape of the projection surface may be measured, based on picked-up image information generated by picking up an image of the projection surface where the pattern image is projected.

According to another aspect, in the control method, the image projection system may include a first projection device and a second projection device. The projection surface may be acquired by coupling together a first projection surface where an image is projected by the first projection device and a second projection surface where an image is projected by the second projection device. According to this aspect, in the image projection system including the first projection device and the second projection device, an undistorted image can be projected with as large a screen size as possible on the three-dimensional projection surface.

According to another aspect of the present disclosure, an image projection system includes a correction device and a projection device as described below. The correction device sets a first coordinate in a two-dimensional projection formed by flattening out a three-dimensional projection surface onto a plane. The correction device also arranges a first quadrilateral having a first aspect ratio within the two-dimensional projection, based on the first coordinate as a reference position, in such a way that the first quadrilateral comes into contact with an outline of the two-dimensional projection. The correction device determines whether the first quadrilateral is in contact with the outline of the two-dimensional projection at two or more points, or not. When the first quadrilateral is determined as being in contact with the outline of the two-dimensional projection at two or more points, the correction device corrects image information, based on the first quadrilateral, and thus generates corrected image information. The projection device projects an image based on the corrected image information onto the projection surface. According to this aspect, too, an undistorted image can be projected with as large a screen size as possible on the three-dimensional projection surface.

According to another aspect, the image projection system according to the present disclosure may include an image pickup device and a measuring device as described below. The image pickup device may pick up an image of a pattern image projected on the projection surface by the projection device and thus generate picked-up image information. The measuring device may measure a three-dimensional shape of the projection surface, based on the picked-up image information. The image pickup device, the projection device, and the measuring device may be formed as a unified structure.

What is claimed is:

1. A control method for an image projection system, the control method comprising:
    setting a first coordinate in a two-dimensional projection formed by flattening out a three-dimensional projection surface onto a plane;
    arranging a first quadrilateral having a first aspect ratio within the two-dimensional projection, based on the first coordinate as a reference position, in such a way that the first quadrilateral comes into contact with an outline of the two-dimensional projection;
    determining whether the first quadrilateral is in contact with the outline of the two-dimensional projection at two or more points, and whether the first quadrilateral is in contact with the outline of the two-dimensional projection at only one point;
    correcting an image information, based on the first quadrilateral, and thus generating the corrected image information, when and only when the first quadrilateral is determined as being in contact with the outline of the two-dimensional projection at two or more points; and
    projecting an image based on the corrected image information onto the projection surface.

2. The control method for the image projection system according to claim 1, wherein
    when the first quadrilateral is determined as not being in contact with the outline of the two-dimensional projection at two or more points, the first coordinate is changed, then the first quadrilateral is arranged within the two-dimensional projection, based on the changed first coordinate as a reference position, in such a way that the first quadrilateral comes into contact with the outline of the two-dimensional projection, and whether the first quadrilateral is in contact with the outline of the two-dimensional projection at two or more points, or not, is determined again.

3. The control method for the image projection system according to claim 1, wherein
    when the first quadrilateral is determined as not being in contact with the outline of the two-dimensional projection at two or more points, a minimum distance along a first axis and a minimum distance along a second axis intersecting the first axis between the first quadrilateral and the outline of the two-dimensional projection are calculated, and the first coordinate is changed, based on the minimum distance along the first axis and the minimum distance along the second axis, and
    the first quadrilateral is arranged within the two-dimensional projection, based on the changed first coordinate as a reference position, in such a way that the first quadrilateral comes into contact with the outline of the two-dimensional projection, and whether the first quadrilateral is in contact with the outline of the two-dimensional projection at two or more points, or not, is determined again.

4. The control method for the image projection system according to claim 1, wherein
    a coordinate of a center position of the two-dimensional projection or a coordinate of a centroid position of the two-dimensional projection is decided as the first coordinate.

5. The control method for the image projection system according to claim 1, wherein
    a second quadrilateral having the first aspect ratio and circumscribing the two-dimensional projection is arranged, based on the first coordinate as a reference position, and the first quadrilateral is generated by reducing the second quadrilateral while maintaining the first aspect ratio.

6. The control method for the image projection system according to claim 1, wherein
    a pattern image is projected on the projection surface, and a three-dimensional shape of the projection surface is measured, based on picked-up image information generated by picking up an image of the projection surface where the pattern image is projected.

7. The control method for the image projection system according to claim 1, wherein
    the image projection system includes a first projection device and a second projection device, and
    the projection surface is acquired by coupling together a first projection surface where an image is projected by the first projection device and a second projection surface where an image is projected by the second projection device.

8. An image projection system comprising:
    a correction device generating corrected image information; and
    a projection device projecting an image based on the corrected image information onto a projection surface, wherein
    the correction device
    sets a first coordinate in a two-dimensional projection formed by flattening out a three-dimensional projection surface onto a plane, and arranges a first quadrilateral having a first aspect ratio within the two-dimensional projection, based on the first coordinate as a reference position, in such a way that the first quadrilateral comes into contact with an outline of the two-dimensional projection,
    determines whether the first quadrilateral is in contact with the outline of the two-dimensional projection at two or more points, and whether the first quadrilateral is in contact with the outline of the two-dimensional projection at only one point, and
    corrects an image information, based on the first quadrilateral, and thus generates the corrected image information, when and only when the first quadrilateral is determined as being in contact with the outline of the two-dimensional projection at two or more points.

9. The image projection system according to claim 8, further comprising:
    an image pickup device picking up an image of a pattern image projected on the projection surface by the projection device and thus generating picked-up image information; and
    a measuring device measuring a three-dimensional shape of the projection surface, based on the picked-up image information.

10. The image projection system according to claim 9, wherein
the image pickup device, the projection device, and the measuring device are formed as a unified structure.

* * * * *